United States Patent
Cohen et al.

(12)

(10) Patent No.: US 6,528,586 B2
(45) Date of Patent: Mar. 4, 2003

(54) COMPOSITIONS OF ELASTOMERIC ETHYLENE/(METH)ACRYLIC (ACID) ESTER COPOLYMER AND POLYLACTONE OR POLYETHER

(76) Inventors: Gordon Mark Cohen, 627 Greythorne Rd., Wynnewood, PA (US) 19096; Robert Louis Dawson, 1220 Elderon Dr., Wilmington, DE (US) 19808; Jerald Rice Harrell, 1708 Forestdale Dr., Wilmington, DE (US) 19803; Sampson Chun-Fai Lee, 532 Danforth Rd., Scarborough, Ontario (CA), M1K 1C6; David John Mitchell, 242 Willingdon Ave., Kingston, Ontario (CA), K7L 5A5

( * ) Notice: Subject to any disclaimer, the term of this patent is extended or adjusted under 35 U.S.C. 154(b) by 0 days.

(21) Appl. No.: 09/885,789

(22) Filed: Jun. 20, 2001

(65) Prior Publication Data

US 2002/0004568 A1 Jan. 10, 2002

Related U.S. Application Data

(63) Continuation-in-part of application No. 09/829,485, filed on Apr. 10, 2001, now abandoned.
(60) Provisional application No. 60/204,634, filed on May 16, 2000.

(51) Int. Cl.[7] .......................... C08L 23/08; C08L 67/04; C08L 71/02
(52) U.S. Cl. ........................ 525/186; 525/404; 525/450
(58) Field of Search ................................. 525/404, 450, 525/186

(56) References Cited

U.S. PATENT DOCUMENTS

| | | | |
|---|---|---|---|
| 3,637,544 A | | 1/1972 | Lundberg et al. |
| 3,897,513 A | * | 7/1975 | Sundet .................. 260/824 R |
| 5,093,429 A | | 3/1992 | Moteki et al. |
| 5,106,909 A | | 4/1992 | Sezume et al. |
| 5,321,088 A | * | 6/1994 | Schwab ..................... 525/186 |

FOREIGN PATENT DOCUMENTS

| | | | |
|---|---|---|---|
| EP | 0 490 354 | | 6/1992 |
| GB | 936732 | * | 9/1963 |
| JP | 5-9298 A | * | 1/1993 |
| WO | WO 91/02767 | | 3/1991 |

OTHER PUBLICATIONS

Liming Zhu et al., An Amphiphilic Graft Copolymer as a Surface–Modifying Additive for Poly (methyl methacrylate), Journal of Polymer Science: Part A: Polymer Chemistry, 1995, 1257–1265, vol. 33, John Wiley & Sons, Inc.

Iliyana V. Berlinova et al., Amphiphilic Graft Copolymers with Poly (oxyethylene) Side Chains: Synthesis via Activated Ester Intermediates—Properties, Journal of Polymer Science: Part A: Polymer Chemistry, 1994, 1523–1530, vol. 32, John Wiley & Sons, Inc.

* cited by examiner

*Primary Examiner*—Robert E.L. Sellers

(57) ABSTRACT

Disclosed are compositions of ethylene and (meth)acrylic acid and ester elastomeric copolymers or of (meth)acrylic ester elastomeric copolymers with polylactones and certain polyethers.

10 Claims, No Drawings

COMPOSITIONS OF ELASTOMERIC ETHYLENE/(METH)ACRYLIC (ACID) ESTER COPOLYMER AND POLYLACTONE OR POLYETHER

This application is a continuation-in-part of application Ser. No. 09/829,485 filed Apr. 10, 2001, abandoned.

FIELD OF THE INVENTION

Disclosed are compositions of ethylene and (meth)acrylic acid and ester elastomeric copolymers or of (meth)acrylic ester elastomeric copolymers with polylactones and certain polyethers. These compositions have improved massing resistance in the uncured state and/or improved low temperature properties in the cured or uncured state. The polylactones or polyethers are preferably at least partially grafted to the elastomeric copolymers.

TECHNICAL BACKGROUND

Copolymers of ethylene and (meth)acrylic monomers, such as alkyl acrylates or methacrylates and acrylic or methacrylic acids, are well known items of commerce. They may broadly be divided into two categories, thermoplastics and elastomers. Most often the former contain relatively high amounts of ethylene, giving them crystallinity derived from ethylene sequences in the polymer. The latter tend to have relatively higher amounts of the (meth)acrylic monomers to break up the ethylene crystallinity, which often results in an elastomeric polymer. As is well known, thermoplastics and elastomers often have differing uses, and differing problems associated with them.

For example, because of their crystallinity and/or glassy natures, thermoplastics may be readily formed into pellets which hold their shape. However, uncured (unvulcanized) elastomers often have the problem of slowly flowing and agglomerating into one (often large) mass, so pellets of elastomers, an often desired product form, may be difficult to preserve in a package. One way of preserving elastomers as pellets is to coat the pellet surfaces with a so-called parting agent. With some elastomers which do not flow readily this may work, but for others an excessive amount of parting agent may be needed, or the parting agent will not prevent massing when used in almost any amount.

In most instances it is desirable that the elastomer stay flexible over as wide a temperature range as possible, particularly lower temperatures, where eventually elastomers become stiff and sometimes brittle. This is not a problem with thermoplastics which are supposed to be stiff. Thus methods for preventing massing and/or improving the low temperature properties of elastomers are commercially valuable.

Various thermoplastics made from ethylene and (meth) acrylic monomers have been reacted (grafted) and/or blended with poly(ethylene glycols), poly(propylene glycols) or polyesters, see for instance British Patent 936,732, U.S. Pat. Nos. 5,106,909, and 5,321,088, and World Patent Application 91/02767. None of these references specifically refer to the use of elastomeric ethylene co-polymers.

U.S. Pat. No. 3,637,544 discloses the mixing of various elastomers containing "ethylenic unsaturation" with polylactones such as polycaprolactones. No mention is made of elastomeric ethylene/(meth)acrylic copolymers.

SUMMARY OF THE INVENTION

This invention concerns a composition, comprising:
(a) an elastomeric first polymer consisting essentially of about 10 to about 80 mole percent of ethylene, about 10 or more mole percent of

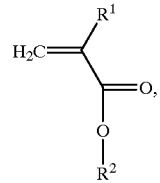

(I)

and up to about 20 mole percent, total, of one or more other polymerizable olefins; and
(b) one or more second polymers chosen from the group consisting of poly(ethylene ethers), poly(1,2-propylene ethers) and polylactones;
wherein:
each $R^1$ is independently methyl or hydrogen; and
each $R^2$ is independently hydrogen, hydrocarbyl or substituted hydrocarbyl;
and provided that when said second polymer is a polylactone it is present as a separate polymer from said first polymer, and/or is grafted to said first polymer, and when said second polymer is said polyethylene ether) or said polypropylene ether) at least some of said second polymer is grafted to said first polymer.

Further disclosed is a second composition which is an elastomeric first polymer consisting essentially of about 60 or more mole percent of:

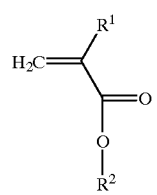

(I)

and up to about 40 mole percent of one or more comonomers selected from the group consisting of aromatic hydrocarbon olefins, acrylonitrile, olefinic monomers containing chlorine, epoxy, or carboxylic acid groups, maleic anhydride, monoalkyl and monoarylalkyl esters of maleic acid, monoalkyl and monoarylalkyl esters of fumaric acid, itaconic anhydride, monoalkyl and monoarylalkyl esters of itaconic acid, and cyanoalkyl acrylates wherein alkyl can contain 2–8 carbon atoms; and
(b) one or more second polymers chosen from the group consisting of poly(ethylene ethers), poly(1,2-propylene ethers) and polylactones;
wherein:
$R^1$ is methyl or hydrogen; and
$R^2$ is hydrocarbyl and/or substituted hydrocarbyl;
and provided that when said second polymer is a polylactone it is present as a separate polymer from said first polymer, and/or is grafted to said first polymer, and when said second polymer is said poly(ethylene ether) or said poly(propylene ether) at least some of said second polymer is grafted to said first polymer.

In this second composition it is preferred that $R^2$ is independently an alkyl containing 1–8 carbon atoms, optionally substituted by one or more ether oxygens. It is also preferred that $R^1$ is hydrogen and each $R^2$ is independently selected from the group consisting of ethyl, butyl, methoxyethyl, ethoxyethyl, and mixtures thereof, with a proviso that at least 50 mol. % of the $R^2$ groups be ethyl, butyl or a combination thereof. A preferred comonomer is acrylonitrile.

DETAILS OF THE INVENTION

Herein certain terms are used, and they are defined below.

By hydrocarbyl is meant a univalent radical containing only carbon and hydrogen. Unless otherwise specified it is preferred that it contain 1 to 30 carbon atoms.

By substituted hydrocarbyl is meant hydrocarbyl containing one or more substituents (functional groups) which do not interfere with (as appropriate) amidation, transesterification and crosslinking. Useful substituents include oxo (keto), halo, ether [which sometimes could be considered (substituted) hydrocarbyloxy groups] and thioether. Unless otherwise specified it is preferred that it contain 1 to 30 carbon atoms.

By a polymerizable olefin is meant an olefin which may copolymerize with ethylene and (I) under the polymerization conditions used to form the polymer.

By olefinic double bond is meant a carbon-carbon double bond which is not part of an aromatic ring.

By an (meth)acrylic compound is meant a compound of formula (I).

By a dipolymer is meant a copolymer containing repeat units derived from two monomers.

By a polyether is meant an organic group which contains two or more ether linkages.

By grafting is meant forming an attachment between a first polymer and a second polymer. It is preferred that the attachment contains esters, amide, imide or carbon-carbon bonds.

By elastomeric or an elastomer is meant that the heat of fusion of any polymer crystallites present with a melting point (Tm) of 50° C. or more is less than 5 J/g, more preferably less than about 2 J/g, and preferably no polymeric crystallites are present at 25° C. (by ASTM D3451), and that the glass transition temperature (Tg) of the polymer is less than about 50° C., more preferably less than about 20° C., and especially preferably less than about 0° C. The Tm and heat of fusion of the polymer are determined by ASTM method D3451 at a heating rate of 10° C./min and the Tm is taken as the peak of the melting endotherm, while the Tg of the polymer is determined using ASTM Method E1356 at a heating rate of 10° C./min, taking the midpoint temperature as the Tg. Both of these are determined on a second heating of the polymer.

Preferably the first polymer used in the present invention is a copolymer of ethylene and (I) [more than one species of (I) may be present], or of ethylene and (I) and the monoethyl ester of maleic or fumaric acids or maleic anhydride. In (I) it is preferred that $R^1$ is hydrogen and/or $R^2$ is hydrocarbyl, more preferably alkyl containing 1 to 6 carbon atoms, and especially preferably methyl [when $R^1$ is hydrogen and $R^2$ is methyl, (I) is methyl acrylate]. A particularly preferred first polymer is ethylene/methyl acrylate dipolymer containing about 13 to about 46 mole percent of methyl acrylate. Specific useful monomers (I) are the methyl, ethyl, propyl, n-butyl I-butyl esters of methacrylic or acrylic acids, more preferably acrylic acid.

Useful polymerizable olefins for the first polymer include maleic anhydride, maleic acid and any of its half acid esters or diesters, particularly its methyl or ethyl half acid esters, fumaric acid and any of its half acid esters or diesters, particularly its methyl or ethyl half acid esters, styrene, α-methylstyrene, and substituted styrenes. For preparation of polyether grafts using amidation reactions, maleic anhydride or the half acid-ester of maleic or fumaric acid is preferred as a comonomer. Especially preferred is the monoethyl ester.

The second polymer is (one or more of) poly(ethylene ether), poly(1,2-propylene ether) and/or a polylactone. When the second polymer is a polylactone it may be present as a "free" polymer in its own right, and/or it may be grafted onto the first polymer. Grafting may be carried out by any method known in the art. For example, a polylactone having at least one hydroxyl end may be reacted with a carboxyl group on the first polymer chain (for instance derived from acrylic acid of methacrylic acid in which $R^2$ is hydrogen) to form an ester thereby grafting the polylactone to the first polymer, or when $R^2$ is hydrocarbyl or substituted hydrocarbyl that ester may be transesterified with the polylactone also resulting in grafting of the polylactone. The polylactone may also be grafted onto the first polymer by a free radical process by mixing the first and second polymers with a free radical source, such as a peroxide, and generating free radicals by heating the mixture, thereby resulting in grafting of the polylactone onto the first polymer. It is preferred that at least 5 mole percent, more preferably at least 10 mole percent, and especially preferably at least 20 mole percent of the polylactone be grafted to the first polymer.

The presence of the polylactone improves the massing resistance of the polymer. When this is an improvement sought by addition of the polylactone, it is preferred that the polylactone (by itself, before blending and/or grafting) be semicrystalline at room temperature, that is have a melting point of >25° C. with a heat of fusion of at least 5 J/g, and more preferably have a melting point >45° C. with a heat of fusion of at least 25 J/g.

If at least some of the polylactone is to be grafted by transesterification or esterification it is preferred that it have an Mn (number average molecular weight) of about 1,000 to about 20,000, more preferably about 2,000 to about 15,000. If the polylactone is to be grafted using peroxide, or not grafted at all, it is preferred that the Mn is about 10,000 to about 100,000, more preferably about 30,000 to about 50,000. If polylactone of the desired Mn is not available directly, it can be made in situ by equilibrating appropriate amounts of two polylactones with differing Mn's, or by partially depolymerizing a higher Mn polylactone with a diol. This in situ generation of the desired Mn is included within the definition of addition of a desired Mn.

The polylactone may also be used to lower the measured Tg of the first polymer, thereby improving the low temperature properties of the composition. When used for this purpose, alone, the Mn of the polylactone is not important, nor is whether the polylactone is grafted. However ungrafted low Mn polylactone may be easily removed from the composition (for example by volatilization or extraction) so the use of ungrafted very low Mn polylactone may not be desirable. When any polylactone is used it is preferred that at least some of it is grafted to the first polymer.

It is preferred that about 2 to about 20 percent by weight of the polylactone, based on the amount of first polymer present, be present in the composition, preferably about 3 to about 15 percent. A preferred polylactone is poly(ε-caprolactone).

The second polymer may also be a poly(ethylene ether) or a poly(1,2-propylene ether), collectively herein polyether.

By a poly(ethylene ether) is meant a group or molecule that contains two or more repeat units —$(CH_2CH_2O)$— and by a poly(1,2-propylene ether) is meant a group or molecule that contains two or more repeat units —$(CH(CH_3)CH_2O)$—. Also within the meaning of poly(ethylene ether) and poly(1,2-propylene ether) is a group or molecule containing the repeat units —$(CH_2CH_2O)_m$—$(CH(CH_3)CH_2O)_n$— wherein m and n are both independently an integer of at least one. Poly(ethylene ether) is a preferred polyether. If n is $\geq 2$ the polyether may be considered a poly(1,2-propylene ether), and if m is $\geq 2$ the polyether may be considered a poly(ethylene ether). Thus, a single polymer may be both a poly(ethylene ether) and a poly(1,2-propylene ether). It is preferred that at least 5 mole percent, more preferably at least 10 mole percent, especially preferably at least 20 mole percent and very preferably at least 40 mole percent of the polyether present is grafted to the first polymer.

The polyether herein may lower the Tg of the first polymer and/or improve the massing resistance of the composition. If lowering of the Tg is the only goal of adding the polyether, the polyether may be of relatively low molecular weight for example a diether, triether or tetraether derived from compounds such as diethylene glycol, triethylene glycol or tetraethylene glycol, respectively. If improved massing resistance is desired, the polyether should preferably be of high enough molecular weight to be semicrystalline. For poly(ethylene ethers) for this purpose, an Mn of about 1500 or more is preferred, more preferably about 2000 or more. In some instances, for optimal grafting and massing resistance, it is preferred that there be a lower-MW component of Mn about 300 to 1000 for grafting and a higher-MW component of Mn about 1500 or more for massing-resistance. For purposes of grafting to lower the Tg of the elastomeric ethylene copolymer, an Mn of about 300–2000 is preferred for the poly(ethylene ethers), more preferably 300–1000, and most preferably 300–750. If the polyether is of Mn>300, it is preferred that about 15–60% by weight of the total polyether (one or more polyether components) in the composition be grafted.

For lower molecular weight polyethers, up to a molecular weight of about 300, it is preferred that a relatively high percentage of the polyether present be grafted to prevent loss of the polyether through volatilization and/or extraction. For the lower molecular weight polyethers the fraction of the added polyether which is grafted (by weight) is preferably about 30–99%, more preferably 30–75%. During processing, some of the ungrafted polyether can be vented from the mixer (for instance, extruder). It is preferred that the amount of ungrafted, low-MW polyether, after such processing, amount to less than about 10–20% of the total polyether left in the product, more preferably 5–10% or lower. The amount of ungrafted polyether (and polylactone) can be determined by extraction of the ungrafted polyether and determination (for example by NMR spectroscopy) of the amount of polyether which is unextracted from the composition.

Preferably the total amount of polyether in the composition will be about 2 to about 20 weight percent of the first polymer present, more preferably about 5 to about 15 percent, and especially preferably about 5 to about 10 percent.

The second polymers herein may act as anti-massing agents and/or lower the Tg of the first polymer. Although not wishing to be bound by theory, it is believed that the second polymers are effective to lower the Tg because they are at least partially miscible with the first polymer. Such miscibility, even partial miscibility, of polymers is unusual. It is believed that the second polymers act especially well as antimassing agents when they themselves are semicrystalline at ambient temperature and preferably have some miscibility with the first polymer.

Grafting of the second polymer onto the first polymer may be carried out in similar ways for both the polyethers and polylactones. If there is a hydroxyl end on the second polymer it may be grafted to a carboxyl group on the first polymer by esterification, or to an ester group on the first polymer by transesterification. If a polylactone is used, during these reactions the polylactone itself may undergo esterification and/or transesterification reactions to change its molecular weight and/or molecular weight distribution. It will be understood by the artisan that if the second polymer has hydroxyl groups on both ends of the polymer it may crosslink the first polymer, which is undesirable. This is particularly true if the second polymer is of lower molecular weight. It is preferred that the second polymer be monofunctional (in the grafting reaction), especially if it is of lower molecular weight. This can easily be accomplished for example in lower molecular weight poly ether by using so-called capped polyethers. For instance instead of using triethylene glycol as the second polymer, a monoalkyl ether of triethylene glycol such as the monomethyl or monobutyl ether of triethylene glycol may be used.

Another polyether which may be grafted onto the first is a polyether which has a single terminal amine group, available for example under the tradename "Jeffamine®" from Huntsman Corp. These polyethers, which often contain blocks of both poly(ethylene ether) and poly(1,2-propylene ether) may be reacted with anhydride, carboxyl and/or ester containing first polymers to be attached to them through amide and/or imide groups. Similar block copolymers which graft through ester, carboxyl or hydroxyl ends on the block copolymers may also be used. Second polymers may also be grafted to the first polymer by free radical grafting, for example mixing the first and second polymers with a free radical generating agent such as a peroxide and heating to generate the free radicals.

The invention also includes a second composition whose elastomeric first polymer consists essentially of acrylate monomer units according to formula (I), and up to 40 mol-% of non-hydrocarbyl acrylate and non-ether-substituted-hydrocarbyl acrylate monomer units. In (I), preferably, $R^1$ is hydrogen, and $R^2$ is hydrocarbyl, more preferably, alkyl containing 1 to 8 carbon atoms optionally substituted by ether oxygen. It will be understood by one of skill in the art that the acrylate moiety of the first polymer may be a mixture of acrylate monomers; that is, not all the $R^2$ groups in the polymer need be the same. In a preferred embodiment, the $R^2$ groups are ethyl or butyl, or a combination of the two. It is well-known in the art to employ up to about 50 mol-% of additional acrylate monomers in combination with ethyl or butyl acrylate, to effect one or another desired modification to the properties of the resultant polymer. Preferred additional acrylate monomers include methoxy ethyl acrylate, ethoxy ethyl acrylate, and mixtures thereof.

The first polymer of this second composition may further be a copolymer of one or more acrylate monomers with up to 40 mol-% of non-hydrocarbyl acrylate and non-ether-substituted-hydrocarbyl acrylate monomers selected from the group consisting of aromatic hydrocarbon olefins, acrylonitrile, maleic anhydride, monoalkyl and monoarylalkyl esters of maleic acid, monoalkyl and monoarylalkyl esters of fumaric acid, itaconic anhydride, monoalkyl and monoarylalkyl esters of itaconic acid, cyanoalkyl acrylates wherein alkyl can contain 2–8 carbon atoms, and curesite monomers containing chlorine, epoxy, or carboxylic acid groups. Acrylonitrile, maleic anhydride, monoalkyl esters of maleic acid, monoalkyl esters of fumaric acid, itaconic anhydride, and monoalkyl esters of itaconic acid, are preferred non-hydrocarbyl acrylate and non-ether-substituted-hydrocarbyl acrylate comonomers.

Useful monomers that contain chlorine, epoxy, or carboxylic acid groups include 2-chloroethyl vinyl ether, vinyl chloroacetate, p-vinylbenzyl chloride, acrylic acid, methacrylic acid, allyl glycidyl ether, glycidyl acrylate, and glycidyl methacrylate. Useful aromatic hydrocarbon olefins include styrene, α-methylstyrene, and substituted styrenes.

As for the first composition of this invention, the second polymer of the second composition may be present as a "free" polymer in its own right, and/or it may be grafted onto the first polymer. Poly(ethylene ethers) and poly(1,2-propylene ethers) with single terminal amine groups are preferred second polymers of this second composition and it is preferred that, in this composition, they be substantially grafted to the polyacrylate first polymers of this composition. It is preferred that the first polymers to which they are grafted are polyacrylates that contain maleic anhydride or monoalkyl and monoarylalkyl esters of maleic acid or monoalkyl and monoarylalkyl esters of fumaric acid or itaconic anhydride or monoalkyl and monoarylalkyl esters of itaconic acid. Also included are compositions that comprise grafts of poly(ethylene ethers) and poly(1,2-propylene ethers) with single terminal amine groups to polyacrylates that contain epoxy, chlorine, and/or carboxylic acid cure sites (cure sites that can react with amines) and grafts of poly(ethylene ethers) and poly(1,2-propylene ethers) with single terminal alcohol groups to any polyacrylate, but in particular polyacrylates without carboxylic acid groups (that may retard grafting), produced by transesterification with the acrylate ester groups. Other such compositions may comprise grafts of poly(ethylene ethers) and poly(1,2-propylene ethers) with single terminal alcohol groups to any polyacrylate that contains carboxylic acid or epoxy or chlorine by esterification with the COOH or catalyzed addition to epoxy or (most difficult) etherification by displacement of chlorine.

All of these grafting reactions may be carried out in ways similar to those known in the art for the particular chemical reaction involved. For example for a transesterification reaction a typical transesterification catalyst such as an alkali metal alkoxide, a tetralkyl titanate, a tin compound such as dibutyltin dilaurate or stannous octoate, or a metal salt such as zinc acetate may be used as a catalyst. Typical amounts of catalyst, such as 0.3–3 weight percent based on total polymer may be used. The grafting reaction may be carried out in solution but is preferably done in neat molten polymer. For example the grafting reaction may be carried out in an extruder. If the second polymer is lower molecular weight, ungrafted second polymer may be removed before exiting the extruder by use of appropriate vacuum zones. Typical temperatures for this reaction are about 100–350° C., more preferably about 180–300° C., and especially preferably about 200–290° C. When carrying out esterification or transesterification grafting reactions it is preferred to predry the ingredients. For instance, if an extruder is used as the reaction vessel, the ingredients (especially first and second polymers) may be predried before being added to the extruder, or may be dried in the first sections of the extruder in vacuum zones, before chemical reactions start taking place.

The compositions of the present invention may also contain other ingredients normally found in elastomers, such as fillers, pigments, reinforcing agents, antioxidants, antiozonants, curing (crosslinking) agents, processing aids, curing agents and plasticizers. Additional anti-massing agents such as octacosane may also be included, preferably in small amounts (see for instance Examples 5–8). These compositions are useful as elastomers which when uncured (uncrosslinked) have improved massing resistance and/or when cured or uncured have improved low temperature properties. These improved low temperature properties are shown by the lower glass transition temperatures (Tg's) of the compositions. The compositions of the present invention may be cured (crosslinked) using methods normally used for such elastomers, see for instance U.S. Pat. No. 5,093,429. In some instances some of the comonomers present in relatively small amounts may act as crosslinking sites. When the second polymer which may be grafted onto the first is a polyether which has a single terminal amine group, it may also be desirable to add the polyether to the first polymer during the compounding stage, i.e. at the time when the other ingredients are added to the elastomeric composition.

In the Examples the following abbreviations are used:
DSC—differential scanning calorimetry
E—ethylene
MA—methyl acrylate
MAME—monoethyl maleate
MW—molecular weight
Mn—number average molecular weight
ODCB—o-dichlorobenzene
PCL—poly(ε-caprolactone)
PEG—poly(ethylene ether)
PEPO—an amine terminated block copolymer containing PEG and poly(1,2-propylene ether) blocks
Tg—glass transition temperature In the Examples the following methods were used to test the polymer compositions.

| Property or Test | ASTM # | Specific Conditions |
|---|---|---|
| Mooney Viscosity | D1646 | Large Rotor; 100 C.; 1 min preheat; 4 min test |
| Rotorless Curometer (MDR) | D5289 | Monsanto MDR-2000 |
| Stress/Strain Properties | D412 | Test Method A using Die C Dumbbell |
| Hardness | D2240 | Durometer Type A |
| Compression Set | D395 | Method B |
| Oil Swell | D471 | % Volume change after immersion for specified time/temperature |
| Clash-Berg | D1043 | Temperature at which the modulus of elasticity is 68.95 MPa ($T_4$ value) |

In the Examples, $^1$H NMR spectra were measured with a Bruker AM-300 (300 MHz) instrument in perdeuterated tetrachloroethane solvent or with a 300 MHz GE spectrometer, Varian Associates Unity 400, or Varian Associates 500 MHz in $CDCl_3$ solvent, optionally with tetramethylsilane as an internal standard. Inherent viscosities were measured in Cannon-Fenske viscometers (#75 for PCL) at 25° C. The polymer concentration was 0.50 g/dl, primarily in toluene for PCL (0.055 g polymer in 11 ml solvent, or 0.075 g/15 ml, measured by pipette). The solutions were filtered through 0.5μ syringe filters. Thermal analyses were performed on a DuPont Instruments Differential Scanning Calorimeter according to the following protocol. A 10–18 mg portion of each sample in a metal container was placed in the spectrometer and kept in a nitrogen atmosphere throughout. The sample was heated from room temperature to 60° C. at 20 degrees/min and held 2 min at 60° C. ("first heat"). The sample was cooled with liquid nitrogen to −100° C. and then heated to 60° C. at 20 degrees/min and held 2 min at 60° C. ("second heat"). The sample was again cooled to −100° C. and heated to 60° C. at 20 degrees/min ("third heat"). Transitions for the second and third heats, only, were reported. Melting points are taken as the peak of the melting endotherm, and Tg's are taken at the midpoint of the inflection.

In the Examples unless otherwise noted melt reactions were conducted batchwise in a Brabender Plasticorder® (C. W. Brabender Instruments, Inc., South Hackensack, N.J., U.S.A.) with a Type 6 Mixer/Measuring Head with roller blades (~60 ml cavity). Scale-up runs were also performed in a Brabender Plasticorder® equipped with a 3-piece Prep Mixer® and roller blades (~350 ml cavity). The typical total charge for the Type 6 was 50 g and for the larger mixer, 250 g. The mixers were cleaned by running them with a mixture of Nordel® rubber (available from DuPont Dow Elastomers, Wilmington, Del., U.S.A.)/Bon Ami® cleanser (or polyethylene/Ajax®), followed by manual cleaning, sometimes with a wire brush. Continuous melt reactions were conducted in a twin-screw extruder described more completely in one of the examples.

Except where noted, all reagents were used as received. Tetrabutyl titanate [Ti(O-n-bu)$_4$], 1,2,3,4-tetramethylbenzene, polyethylene glycol methyl ethers and oligoethylene glycol alkyl ethers were obtained from the Aldrich Chemical Company. o-Dichlorobenzene (ODCB), xylenes, methylene chloride ($CH_2Cl_2$), and methanol were obtained from EM Science. Isodurene (~90%) was obtained from the Fluka Chemical Corporation and toluene from Fisher Scientific. Poly-ε-caprolactone was obtained from either Polysciences or Union Carbide. Poly(ethylene-co-methyl acrylate) dipolymers and poly(ethylene-co-methyl acrylate-co-ethyl hydrogen maleate) terpolymers were obtained from the DuPont Company, Wilmington, Del., U.S.A. A dipolymer with 62 wt % methyl acrylate (MA) and a melt index (190° C.) of ~40 g/10 min is designated E/62MA, another with 59 wt % MA and a melt index of ~8 is designated E/59MA, and a third polymer with 72 wt % MA and a melt index of ~40 is designated E/72MA.

Except for Examples 1–4, the typical protocol for all reactions in both smaller and larger mixers was 2 min pre-mix of reagents, catalyst addition, and 13 min of reaction time, after start of catalyst addition. Thus, the total mixing time was 15 min.

EXAMPLE 1

To a Type 6 Mixer at 245° C. and blanketed with nitrogen were charged 40.0 g E/72MA and 10.0 g poly-ε-caprolactone diol ("PCL diol") (MW~2000, Polysciences, cat. # 9694). With the ram down, the polymers were mixed at 75 rpm for 2 min. Then 0.58 ml of a 10% (w/w) Ti(O-n-bu)$_4$ solution in xylenes was injected into the melt through the center opening with the ram up, under a blanket of nitrogen, gradually enough to disperse the reagent as well as possible. The ram was again closed, maintaining the nitrogen blanket. The torque began to rise rapidly soon after catalyst addition, peaking at 990 m-g about 4 min after the addition, then dropping rapidly as the material gelled and became a crumbly solid. The mixing was terminated and the polymer removed 5 min after the start of catalyst addition.

EXAMPLE 2

A similar experiment to Example 1 was conducted with ~9000-MW poly-ε-caprolactone ("PCL") (Polysciences, cat. # 19561, $\eta_{inh}$=0.272 in toluene) in place of the 2000-MW PCL diol. The initial torque of the mixture was ~93 m-g. Six min after catalyst addition, the torque began to rise from ~70 m-g gradually to a peak of ~185 m-g at 13 min after catalyst addition, at which time the mixing was terminated and the product removed. The polymer melt remained transparent throughout the mixing.

EXAMPLE 3

Another similar experiment to Example 1 was conducted with ~30,000-MW PCL (Polysciences cat. # 7039), and no torque change was observed. The initial torque was 60–90 m-g, and remained primarily flat at 60 m-g throughout the reaction. The melt was initially transparent-to-translucent and, at the end of the reaction, transparent.

EXAMPLE 4

Another similar experiment to Example 1 was conducted with ~9,000-MW PCL (Polysciences, cat. # 19561) but without the addition of titanate catalyst, to prepare a simple, unreacted blend. The sample was mixed for 15 min after addition of the polymer to the mixer. The melt was very fluid throughout and there was no torque change. The final torque was ~34 m-g.

EXAMPLES 5–8

To a Type 6 Mixer at 245° C. and blanketed with nitrogen were charged the 45.0 g of the E/MA copolymers and 5.0 g of the PCL's or blend of PCL's shown in Table 1. With the ram down, the polymers were mixed at 75 rpm for 2 min. Then a portion of a 10% (w/w) Ti(O-n-bu)$_4$ solution in xylenes (volume specified in Table 1) was injected into the melt through the center opening with the ram up, under a blanket of nitrogen, gradually enough to disperse the reagent as well as possible. The ram was again closed, maintaining the nitrogen blanket. In one case (see Table 1), half of the PCL was added 11 min after the start of mixing. The mixing was terminated and the product removed 13 min after catalyst addition. The polymer melt was transparent or translucent during mixing.

Each product was evaluated for massing-resistance. The test described below is intended to simulate warehouse storage of pellets of the polymer products, in bags individually packaged in boxes ("bag-in-a-box"). The product from the Brabender Plasticorder® was blended with 5% octacosane and about 20 g extruded in a CSI-MAX® mixing extruder (Model CS-194, Custom Scientific Instruments, Cedar Knolls, N.J.). The mini extruder's rotor temperature was 115–120° C., head temperature was 180–190° C., and drive motor setting was "90". The resulting polymer strand was quenched in a 2% dispersion of zinc stearate in cold water. The strand was cut into pellets with a 1 to 1.5 length:diameter ratio and dusted by shaking with HiSil® 233 in a plastic bag or aluminum tray. Excess dust was shaken off and the pellets were placed in a glass jar. A 2.54 cm (1") thick bed of pellets was placed under a 38 g load, while the jar was placed in a 40° C. oven for 24 hr and then 7 d. The pellets were tested for massing by pouring them out of the jar after the specified periods of time. Those that did not mass flowed easily out of the jar ("easily flow"), those that massed did not flow out of the jar ("no flow"), and those that were only slightly massed flowed reasonably readily ("flow").

TABLE 1

| EXAMPLE | 5 | 6 | 7 | 8 |
|---|---|---|---|---|
| E/62MA, g | 45.0 | 45.0 | — | 45.0 |
| E/59MA, g | — | — | 45.0 | — |
| PCL | | | | |
| 9000-MW (Polysciences #19561), g | 2.5 | 2.5 | 5.0 | 5.0 |
| 30,000-MW (Polysciences #7039), g | 2.5 | 2.5* | — | — |
| 10% (w/w) Ti(o-n-bu)$_4$/xylenes, ml | 0.58 | 0.58 | 0.58 | 0.78 |
| Massing-resistance: | | | | |
| Pellets after 24 hr/38 g load/40° C.** | flow | easily flow | easily flow | easily flow |
| Pellets after 7 da/38 g load/40° C.** | flow | flow | easily flow | easily flow |

*Added 11 min into mixing cycle, 9 min after catalyst addition.
**"Flow" does not mean massing, but is an indication of massing-resistance. The term, "flow", indicates that the pellets are free-flowing, that they can be poured from their container.

EXAMPLES 9–10 AND COMPARATIVE EXAMPLE A

E/59MA was mixed with PCL in the manner described for Examples 5–8, except that the quantities of PCL and catalyst were as specified in Table 2. In one case, a simple blend was prepared because no Ti(O-n-bu)$_4$ catalyst was added to the mixture so that transesterification-grafting would be avoided. The massing-resistance of the products was compared with the E/59MA starting material (Comparative Example A): this polymer was used as is, not mixed in the Brabender Plasticorder®. For the massing-resistance tests, the polymers were not treated with octacosane, and the extrusion was run at a rotor temperature of 80° C. and head temperature of 150° C. Massing was tested only after 24 h at 40° C. The results in Table 2 show that E/59MA masses, PCL provides some resistance to massing when it is added without reaction, and grafting of PCL provides even more massing-resistance. In some instances, where the Ti(O-n-bu)$_4$ catalyst may interfere with certain applications of the product, it may be desirable to add only the PCL and obtain a smaller measure of massing-resistance.

TABLE 2

| EXAMPLE | A | 9 | 10 |
|---|---|---|---|
| E/59MA, g | 50.0 | 45.0 | 45.0 |
| PCL~9000-MW (Polysciences #19561), g | — | 5.0 | 5.0 |
| 10% (w/w) Ti(O-n-bu)$_4$/xylenes, ml | — | — | 0.58 |
| Massing-resistance: Pellets after 24 hr/38 g load/40° C.* | no flow; pellets "molded" together | pellets stick together, but can be crumbled apart in hand | easily flow |

*"Flow" does not mean massing, but is an indication of massing-resistance. The term, "flow", indicates that the pellets are free-flowing, that they can be poured from their container.

EXAMPLE 11 AND COMPARATIVE EXAMPLE B

E/62MA was mixed with PCL in the manner described for Examples 5–8, except that a mixture of low- and high-MW PCL's were used in the amounts shown in Table 3 and that catalyst composition and quantity were used as shown. The PCL's may equilibrate to some degree, to a more uniform MW distribution, during the course of the transesterification-grafting reaction. Massing resistance was tested as described for Examples 5–8, including the treatment of the products with 5% octacosane prior to extrusion and pelletization. The results in Table 3 show that E/62MA masses when treated with Ti(O-n-bu)$_4$ catalyst alone (Comparative Example B), even though mixer torque (a measure of melt viscosity) rose much more than when PCL was additionally present. The PCL blend provides massing-resistance and can therefore be used in place of a single PCL component of intermediate MW.

TABLE 3

| EXAMPLE | B | 11 |
|---|---|---|
| E/59MA, g | 50.0 | 45.0 |
| PCL, Tone ® Polyol 2241 (MW~2000), g | — | 0.81 |
| PCL, Tone ® Polymer P-767E (M$_n$~43,000), g | — | 4.2 |
| 50% (w/w) Ti(o-n-bu)$_4$/o-dichlorobenzene, ml | 0.14 | 0.17 |
| Massing-resistance: | | |
| Pellets after 24 hr/38 g load/40° C.* | flow | easily flow |
| Pellets after 7 da/38 g load/40° C.* | no flow | easily flow |

*"Flow" does not mean massing, but is an indication of massing-resistance. The term, "flow", indicates that the pellets are free-flowing, that they can be poured from their container.

EXPERIMENT 1

Union Carbide Tone® PCL Polymer P-767E (lot # 2799, M$_n$~43,000) was dried overnight at 45° C. in a vacuum oven under vacuum with a slow nitrogen bleed. A 150-g portion of the dried PCL was charged to a resin kettle, equipped with Aldrich adapter, stopper, and mechanical stirrer, and previously dried by heating with a heat gun. Then 1.134 g of 1,6-hexanediol (Aldrich, 99%), dispensed by weighing paper, was added and the flask and contents purged with nitrogen. The catalyst (0.72 ml of 10% [w/w] Ti[O-n-bu]$_4$ in xylenes) was then syringed in through the Aldrich adapter as the kettle was held under a slightly positive pressure of nitrogen. The kettle was placed in a ~240° C. oil bath, cooling it to ~210–215° C. The components were stirred as the oil bath returned to 225° C., the new set-point. The "time zero" was recorded when the bath reached 225° C. or the stirring rate rose to 45 rpm (at a 20% Variac® setting, motor on full voltage), whichever came first. The reaction was terminated when the rpm rose to a steady value (end of MW loss) or 200 min after the "zero point", whichever came first. The reaction leveled off at a stirring rate of 195 rpm within about an h. The product had an inherent viscosity of 0.273 dl/g.

EXPERIMENT 2

Union Carbide Tone® PCL Polymer P-767E (lot # 2799, M$_n$~43,000) was dried overnight at 45° C. in a vacuum oven under vacuum with a slow nitrogen bleed. A 150-g portion of the dried PCL was charged to a resin kettle, equipped with Aldrich adapter, stopper, and mechanical stirrer, and previously dried by heating with a heat gun. Then 1.349 g of 1,6-hexanediol (Aldrich, 99%), dispensed by weighing paper, was added and the flask and contents purged with nitrogen. The catalyst (1.72 ml of 10% [w/w] Ti[O-n-bu]$_4$ in xylenes) was then syringed in through the Aldrich adapter as the kettle was held under a slightly positive pressure of nitrogen. The kettle was placed in a 240° C. oil bath, cooling it to 220° C. The components were stirred with the oil bath held mainly at 223–7° C. The "time zero" was recorded when the bath reached ~225° C. or the stirring rate rose to 45 rpm (at a 20% Variac® setting, motor on full voltage), whichever came first. The reaction was terminated when the rpm rose to a steady value (end of MW loss), or ~200 min after the "zero point", whichever came first. The reaction leveled off at a stirring rate of ~160 rpm after about 190 min and was continued for another 23 min for a total of 213 min. The product had an inherent viscosity of 0.278 dl/g. This process was repeated 4 times with different lots of the same PCL, yielding polymers with inherent viscosities of 0.274, 0.278, 0.264, and 0.276 dl/g.

The five cracked PCL's were melt-blended in a 1—1 resin kettle under nitrogen blanket, stirring with a metal stirring rod and blade, in a 240° C. oil bath. Mixing was slow at first, speeding up as the polymer melted, and then vigorous for 15 min, cooling the oil bath to ~200° C. The blended polymer was discharged onto a tray line with Teflon®-coated foil, covered with aluminum foil and blanketed with nitrogen. The inherent viscosity of the mixture was 0.272 dl/g.

EXAMPLES 12–14 AND COMPARATIVE EXAMPLE C

To a Brabender Prep Mixer® at 245° C. and under nitrogen blanket, roller blade speed 75 rpm, were charged 225 g of E/62MA (previously milled into a sheet that could be easily fed into the Brabender) and 25 g of the blend of cracked PCL from Experiment 2. The temperature of the mixer declined and, because it recovered slowly to only 229° C. 8 min later, the set temp was raised to 260° C. to accelerate heating. When the temperature reached 244° C. at the 13 min mark, the set point was returned to 245° C. and catalyst (0.90 ml of 25% [w/w] Ti[O-n-bu]$_4$ in 1,2,3,4-tetramethyl benzene) was gradually added by syringe. In comparison with this 13 min precatalyst mixing time, a 2-min pre-catalyst mixing time is generally preferred. Enough catalyst was added to achieve about a trebling of the starting torque (melt viscosity). The torque rose quickly, from 480 m-g to a peak of ~1300 m-g and the temperature held steady at ~245° C. The run was terminated at 26 min, 13 min after catalyst addition. In subsequent runs, the set-point was moved up from 245° C. to 260° C. at the time of polymer addition and restored to 245° C. when the mixture approached this temperature. The product had a 100° C. Mooney viscosity (ML-1+4) of 8. When dissolved in CH$_2$Cl$_2$, in Example 12 visible specks of gel were left on the walls of the glass container. The polymer of Example 14 was prepared in a similar manner, except that a blend of high- and low-MW commercial PCL's was substituted for the cracked PCL, as shown in Table 4. In Example 13 (peroxide modification), 2.6 g of Vanfre® VAM and 5.7 g of Luperco® 230XL were milled into 234 g of E/62MA prior to charging the Brabender. The Brabender, pre-heated to 160° C., was charged with the E/62MA pre-mix and 26 g of cracked PCL, mixed 9 min, and discharged. The torque reached a peak of ~5500, considerably higher than for the PCL ester-exchange runs. The product had a 100° C. Mooney viscosity (ML-1+4) of 17. The product of Example 13 dissolved completely in CH$_2$Cl$_2$, but the solution appeared cloudy, probably because of the inorganic carrier for the Luperco® peroxide.

The products of Examples 12–14 were evaluated for massing-resistance as described for Examples 5–8, except that they were not treated with 5% octacosane prior to extrusion and pelletization. All were massing-resistant, as reported in Table 4. The products were compounded and vulcanized, and the physical properties of the vulcanizates compared with one that was similarly prepared from Vamac® D (available from E. I. du Pont de Nemours and Company, Wilmington, Del., U.S.A.), a commercial polymer derived from untreated E/62MA (Comparative Example C). The PCL-treated products combine physical properties comparable to the untreated polymer and superior massing-resistance.

TABLE 4

| EXAMPLE | 12 | 13 | 14 | C |
|---|---|---|---|---|
| E/62MA, g | 225 | 234 | 225 | — |
| Vamac ® D | — | — | — | 250 |
| Cracked PCL (Experiment 2), g | 25 | 26 | — | — |
| Tone ® PCL Polymer P-767E ($M_n$~43,000), g | — | — | 21 | — |
| Tone ® PCL Polyol 2241 ($M_n$~2,000), g | — | — | 4 | — |
| 25% (w/w) Ti(o-n-bu)$_4$/ 1,2,3,4-tetramethyl-benzene, ml | 0.90 | — | 1.4 | — |
| Vanfre ® VAM, g | — | 2.6 | — | — |
| Luperco ® 230XL, g | — | 5.7 | — | — |
| Reaction temperature | 245° C. | 160° C. | 245° C. | — |
| Massing-resistance: | | | | |
| Pellets, 1 d and 7 d/38 g load/40° C. | easily flow | easily flow | easily flow | |
| Vulcanizate* (cured 20 min/170° C.) | | | | |
| Shore A hardness | 59.5 | 57.0 | 59.0 | 60.0 |
| Compression set, 70 hr/150° C. | 37% | 55% | 33% | 22% |
| Clash Berg (° C.) | −31.5 | −25.0 | −25.0 | −25.5 |
| Tensile (D412): | | | | |
| M$_{100}$ (MPa) | 4.5 | 4.1 | 4.3 | 4.6 |
| T$_B$ (MPa) | 8.4 | 11.3 | 10.7 | 13.1 |
| E$_B$ (%) | 153 | 197 | 186 | 197 |
| Oil Swell ASTM #3 oil, 70 hr/150° C. | | | | |
| % volume swell | 40.3 | 40.2 | 41.2 | 54.3 |

*All vulcanizates: Polymer (100), Naugard ® 445 (1), Stearic acid (1.5), Vanfre ® VAM (0.5), SRF black (60), Vulkup ® R (3.2), HVA-2 (2)

EXAMPLE 15

For comparison the T$_g$'s of untreated E/59MA, E/62MA, and E/72MA were measured (respectively, Comparative Examples D, E, and F) and reported in Table 5. The T$_g$ of PCL was also measured (Comparative Example G), to show that it was lower than the E/MA's. Tg's of other samples, as indicated in Table 5, were also measured. Lower Tg of the sample generally indicates improved low temperature properties, i.e., the product is usable to lower temperatures. Lowering of the Tg of the E/MA dipolymer by the added PCL indicates probable (at least) partial miscibility.

TABLE 5

| Sample of Example | T$_g$ (second heat), ° C. | T$_g$ (third heat), ° C. |
|---|---|---|
| D | −24.6 | −24.3 |
| 9 | −24.6 | −25.2 |
| 10 | −27.3 | −25.3 |
| E | −20.7 | −21.0 |
| 6 | −23.8 | −24.2 |
| 8 | −26.5 | −25.3 |
| F | −11.3 | −11.0 |
| 2 | −22.9 | −21.9 |
| 4 | −24.9 | −23.7 |
| G | −52.9 | −53.8 |

EXAMPLES 16–19

To a Type 6 Mixer at 250° C. and blanketed with nitrogen were charged E62/MA copolymers and the PEG's shown in Table 6. With the ram down, the polymers were mixed at 75 rpm for 2 min. Then a portion of a 50% (w/w) Ti(O-n-bu)$_4$ solution in ODCB (volume specified in Table 6) was optionally injected into the melt through the center opening with the ram up, under a blanket of nitrogen, gradually enough to disperse the reagent as well as possible. The ram was again closed, maintaining the nitrogen blanket. The mixing was terminated and the product removed 13 min after catalyst addition. The polymer melt was transparent during mixing, suggesting melt-miscibility. After cooling to RT, the products containing PEG with MW~550–750 were transparent or nearly transparent and those containing PEG with MW~2000–5000 were opaque presumably due to crystallization of a portion of the PEG, suggesting the possibility of obtaining improved massing-resistance.

To extract ungrafted PEG and thereby determine the extent of grafting of PEG to E/62MA, some of these products were dissolved and then precipitated from solution, with the procedure described below. The ungrafted PEG remained in solution because it is soluble in the precipitant. The "grafts" were those products treated with titanate catalyst during reaction and the "blends" were those not treated with titanate. The extraction results in Table 6 show that, for those graft products tested, substantially more product is precipitated because at least some of the PEG is attached to the insoluble E/62MA.

Eight one-g portions of grafts or melt blends of PEG and E/62MA were each dissolved in 80 ml of acetone, the solutions precipitated by dripping slowly into 400 ml of well-stirred deionized water. Liquid was decanted from the rubbery polymer, which was squeezed to expel additional liquid. The solid was washed three times with 100-ml portions of water, kneaded each time to promote extraction of impurities, then the liquid decanted and the polymer squeezed to expel additional liquid. The solid was dried overnight in a fume hood and then to constant weight (at least 24 hr) in a vacuum oven at 60° C., under vacuum with a slight nitrogen bleed. The amount of extract was determined as the difference between 8.0 g and the recovered, dry weight. For the blends, the calculated extract exceeded the theoretical amount of PEG by 0.13–0.14 g, which was attributed to a water-extractable fraction of E/MA. In calculating the grafting level for reaction products, it was assumed that this fraction constituted part of the extract and weighed 0.13–0.14 g. Results are shown in Table 6 below.

TABLE 6

| EXAMPLE | 16 | 17 | 18 | 19 |
|---|---|---|---|---|
| Type | Blend | Blend | Graft | Graft |
| Recipe: | | | | |
| E/62MA, g | 40 | 40 | 40 | 40 |
| PEG, nominal MW | 550 | 2000 | 550 | 2000 |
| PEG, g | 10 | 10 | 10 | 10 |
| 50% (w/w) Ti(O-n-bu)$_4$/ODCB, ml | — | — | 0.086 | 0.086 |
| Extraction: | | | | |
| Starting wt, g | 8 | 8 | 8 | 8 |
| Calc. PEG in sample, g (A) | 1.6 | 1.6 | 1.6 | 1.6 |
| Extracted wt, g (X) | 6.27 | 6.26 | 6.99 | 6.51 |
| Calcd. extract, g (B = 8.0 − X) | 1.73 | 1.74 | 1.01 | 1.49 |
| Calcd. E/MA in extract, g (B − A) | 0.13 | 0.14 | (0.13*) | (0.14*) |
| PEG grafted, g (D = A − B + C) | 0 | 0 | 0.72 | 0.25 |
| % PEG grafted (D/A) | 0 | 0 | 45% | 16% |

*Assumes amount of extracted E/62MA extracted is same as for corresponding blend.

EXAMPLES 20–22

A mixture of polyethylene glycol methyl ethers was grafted onto E/62MA as described for Examples 16–19, except that the lower-MW PEG component was added before the 25 wt % Ti(O-n-bu)$_4$/ODCB catalyst solution, the higher-MW PEG component was added 11 min after the catalyst, and the mixing was terminated 2 min later, 13 min after catalyst addition. The PEG with MW~550 was used to optimize grafting and the PEG with MW~2000 or ~5000 to improve on crystallization in the product at room temperature, to provide improved massing-resistance. Massing-resistance was measured by the method described for Examples 5–8, including the treatment of the products with 5% octacosane prior to extrusion and pelletization. The massing-resistance was also tested without the addition of octacosane. The ingredients and massing results are shown in Table 7. All octacosane-treated products exhibited some massing-resistance after one day under load at elevated temperature, and several resisted massing for one week.

TABLE 7

| EXAMPLE | 20 | 21 | 22 |
|---|---|---|---|
| E/62MA, g | 45 | 45 | 45 |
| PEG, Avg. MW~550, g | 2.5 | 1.5 | 2.5 |
| 25% Ti(O-n-bu)$_4$/ODCB, ml | 0.32 | 0.15 | 0.17 |
| PEG added 11 min after catalyst | | | |
| PEG, avg. MW~2000, g | — | 3.5 | — |
| PEG, avg. MW~5000, g | 2.5 | — | 2.5 |
| Massing-resistance: | | | |
| Pellets with 5% octacosane, after | | | |
| 24 h/38 g load/40° C. | easily flow | easily flow | flow |
| 7 d/38 g/40° C. | easily flow | easily flow | no flow |
| Pellets without octacosane, after | | | |
| 24 h/38 g/40° C. | easily flow | easily flow | — |
| 7 d/38 g/40° C. | no flow | no flow | — |

EXAMPLE 23

Polyethylene glycol methyl ether (MW~550) was grafted onto E/62MA in the manner described for Examples 16–19, except that 42.5 g of E/62MA, 7.5 g of PEG, and 0.30 ml of 25% (w/w) Ti(O-n-bu)$_4$ in isodurene were used and the reaction was conducted at 250° C. The PEG extraction was performed as described for Examples 16–19, and the amount grafted was computed from weights of both the precipitated product and the solid obtained from drying the filtrate. The % grafted PEG was also computed from NMR spectra.

For the $^1$H NMR analysis, each sample was dissolved at a 1% concentration in perdeuterotetrachloroethane, treated with a small amount of trifluoroacetic anhydride, and heated about 30 min at about 100° C. to enable the anhydride to consume the OH terminal groups of the unreacted PEG. Protons resulting from the reaction of trifluoroacetic anhydride with the OH terminals of the ungrafted PEG appear at $\delta 4.5$ ppm (CH$_2$OC[O]CF$_3$). Protons resulting from the grafting of PEG onto E/MA appear at $\delta 4.2$ ppm (CH$_2$OCO moiety linked to the polymer backbone). Protons that represent the methyl acrylate (MA) content at the beginning of the reaction appear at $\delta 2.3$ ppm (CHCOO moiety). The grafted/total (grafted+unreacted) PEG is determined by dividing the area under the $\delta 4.2$ ppm peak by the sum of the areas under the peaks at $\delta 4.2$ and $\delta 4.5$ ppm. The mol % of MA replaced by PEG, which is thereby grafted to the E/MA backbone, is determined by dividing the area under the $\delta 4.2$ ppm peak by the area under the $\delta 2.3$ ppm peak and adjusting for the number of protons that each peak represents.

Results of these analyses are given in Table 8.

TABLE 8

| From precipitation of acetone solution | | From $^1$H NMR, derivatization with trifluoroacetic anhydride | |
|---|---|---|---|
| into H$_2$O | | % grafted, | % grafted, from |
| % grafted Based on residue | % grafted Based on filtrate | from Grafted/ ungrafted CH$_2$ | Grafted CH$_2$/ CH (MA) |
| 43% | 51% | 30% | 36% |

EXAMPLES 24–34 AND COMPARATIVE EXAMPLES H AND I

A series of E/MA-PEG grafts were prepared in the manner described for Examples 16–19, except that the quantities of ingredients are as described in Table 9. The added PEG lowered the $T_g$ of all varieties of E/MA that were tested, and the magnitude of the change was proportional to the amount of PEG in the product, as shown by Table 10. The $T_g$'s of the parent E/MA copolymers are also shown in Table 10 as Comparative Examples H (E/62MA) and I (E/72MA).

EXAMPLES 35 AND 36 AND COMPARATIVE EXAMPLES K AND J

Example 35

Several batches of a graft of polyethylene glycol methyl ether (MW~550) onto E/72MA were prepared in the manner described for Examples 16–19, except that 45.0 g of E/72MA, 5.0 g of PEG, and 0.20 ml of 25% (w/w) Ti(O-n-bu)$_4$ in isodurene were used for each batch and the reaction was conducted at 250° C. The batches were combined in order to provide sufficient quantity for compounding on a rubber mill, vulcanization, and evaluation of vulcanizate properties. The fraction of the PEG which was grafted was determined by extraction of the mixture by the dissolution and precipitation procedure described for Examples 16–19. The $T_g$ was measured by DSC on a portion of the mixture and another portion was compounded and cured as shown in Table 11.

TABLE 9

| EXAMPLE | 24 | 25 | 26 | 27 | 28 | 29 | 30 | 31 | 32 | 33 | 34 |
|---|---|---|---|---|---|---|---|---|---|---|---|
| E/MA, type | E/62MA | E/62MA | E/62MA | E/62MA | E/62MA | E/62MA | E/72MA | E/72MA | E/72MA | E/72MA | E/72MA |
| E/MA, wt, g | 47.5 | 45 | 42.5 | 42.5 | 40 | 28 | 47.5 | 45 | 42.5 | 40 | 28 |
| PEG, Avg. MW~550, g | 2.5 | 5 | 7.4 | 7.5 | 10.1 | 12 | 2.5 | 5 | 7.4 | 10 | 12 |
| 25% (w/w) Ti(O-n-bu)$_4$/ isodurene, ml | 0.7 | 0.22 | 0.4 | 0.3 | 0.3 | 0.2 | 0.35 | 0.3 | 0.2 | 0.21 | 0.1 |
| Mix time after catalyst addition | 15 min | 12 min | 15 min | 15 min | 15 min | 15 min | 15 min | 15 min | 15 min | 13 min | 15 min |

TABLE 10

| | Tg (DSC), ° C. | |
|---|---|---|
| Sample of Example | 2nd. Heat | 3rd. Heat |
| H | −24 | −24 |
| 24 | −28 | −28 |
| 25 | −34 | −34 |
| 26 | −36 | −36 |
| 27 | −37 | −38 |
| 28 | −38 | −39 |
| 29 | −43 | −45 |
| I | −15 | −16 |
| 30 | −22 | −22 |
| 31 | −24 | −26 |
| 32 | −31 | −32 |
| 33 | −34 | −36 |
| 34 | −38 | −39 |

Example 36

The process of Example 35 was repeated, with several batches prepared from 45.0 g of E/62MA, 5.0 g of PEG, and 0.55 ml of 25 % (w/w) Ti(O-n-bu)$_4$ in isodurene. Results are given in Table 11.

Comparative Examples J and K

The DSC's of unmodified E/72MA and E/62MA were measured and the polymers were compounded and vulcanized as above, respectively Comparative Examples J and K. The DSC and vulcanization results were compared with the grafted samples, as reported in Table 11.

TABLE 11

| EXAMPLE | J | 35 | K | 36 |
|---|---|---|---|---|
| Composition[1] | E/72MA | E/72MA-g-PEG | E/62MA | E/62MA-g-PEG |
| T$_g$ (° C.), uncompounded | −15 | −26 | −24 | −33 |

TABLE 11-continued

| EXAMPLE | J | 35 | K | 36 |
|---|---|---|---|---|
| % PEG grafted (reprecipitation) | | | | |
| based on residue | | 81 | | 55 |
| based on PEG in filtrate | | 70 | | 51 |
| Vulcanizate Properties[2] | | | | |
| Clash Berg temp (° C.) | −18 | −25 | −26 | −30 |
| Shore Hardness, A | 67 | 63 | 66 | 63 |
| Mooney Viscosity 100° C., ML-4 | 18 | 24 | 19 | 25 |
| Stress-strain, 25° C. | | | | |
| $M_{100}$ (MPa) | 0.91 | 0.99 | 1.03 | 1.04 |
| $T_B$ (MPa) | 6.79 | 6.17 | 8.97 | 7.49 |
| $E_B$ (%) | 624 | 490 | 575 | 538 |
| Fluid Resistance, % volume change | | | | |
| ASTM #3, 70 h/150° C. | 28 | 22 | 55 | 45 |
| $H_2O$, 70 h/100° C. | 5.8 | 3.7 | 4.2 | 2.7 |

[1]Graft polymer recipes (reaction at 250° C.): E/72MA (45.0 g), PEG-Me MW 550 (5.0 g), 25 wt % Ti(O-n-bu)4/isodurene (0.20 ml) E/62MA (45.0 g), PEG-Me MW 550 (5.0 g), 25 wt % Ti(O-n-bu)4/isodurene (0.55 ml)
[2]Vulcanizate recipe: polymer (100), Vanfre ® VAM (0.5), Armeen ® 18D (0.5), stearic acid (2), Naugard ® 445 (1), Cab-o-sil ® M-7D (20), Atomite ® Whiting (40), Vulcup ® R (2.5), HVA-2 (1)
Press cure: 15 min @ 177° C.

The results in Table 11 show that the balance of solvent and temperature resistance is improved. The physical properties of the peroxide-cured materials are similar to the unmodified polymers in the Comparative Examples. Flexibility at low temperature, as determined by "Clash Berg" in the table, is improved by grafting, indicative of superior low-temperature performance. The products with PEG have reduced oil-swell. The balance of oil swell to low temperature properties is improved: for example, the vulcanizate derived from the E/72MA-PEG product (Example 34) has much lower oil swell than the one based on unmodified E/62MA (Comparative Example K), but has comparably low Clash-Berg temperature. Surprisingly, despite the water-solubility of PEG, hot water swell is not increased and is, unexpectedly, somewhat reduced.

EXAMPLES 37–45 COMPARATIVE EXAMPLE L

The following equipment was used for these Examples:
(a) A 5.1 cm (2") satellite single-screw extruder to feed E/MA elastomer.
(b) Berstorff® (Florence, Ky., USA) ZE-25 twin screw extruder, 25 mm diameter, L/D=38, co-rotating, intermeshing. A hard working screw design was employed, including blister rings, kneading, mixing and reverse elements. These elements created regions of hold-up (melt seals) at several places along the screw.
(c) two ISCO® (ISCO Inc., Lincoln, Nebr., USA) digital syringe pumps, model 500D, to feed PEG and catalyst solution
(d) vacuum pump (vacuum 3.2 kPa absolute)
(e) refrigerated cold trap working at −60° C.
The following materials were used:

| | |
|---|---|
| E/62MA | DuPont Company Wilmington, DE U.S.A. |
| poly(ethylene glycol) methyl ether, MW ~350 and ~550 | Supplier: Aldrich |
| titanium (IV) butoxide | Supplier: Aldrich Assay: 99% |
| toluene | Supplier: Fisher |

The E/MA polymer was fed at a controlled rate into the Berstorff extruder, the polymer at a temperature of about 100° C. at the point of injection into the Berstorff, Zone 1. The Berstorff extruder consisted of 8 zones, Zones 2–8 heated to the same temperature (260–280° C.), specified in Table 12, and a ninth zone (the die) set at 200° C. The polyethylene glycol methyl ether (PEG) was fed into Zone 2 (at the input end) of the Berstorff extruder, at a rate of 7.0 ml/min. Each day, a fresh batch of catalyst solution (25% w/w tetrabutyl titanate in toluene) was prepared and put into the ISCO syringe pump for delivery either to Zone 3 or Zone 5 of the Berstorff. A vacuum vent port was located at Zone 7. After a steady-state throughput was achieved, and prior to injecting alcohol and catalyst, the E/62MA polymer flow-rate was checked by weighing the output of polymer over a 2-min interval. The polymer feed-rate was approximately 63 g/min. Its residence time in the extruder was about 1.2–1.5 min, determined during a previous run under similar conditions with a different grafting agent. The polymer exiting the die was collected in tared polytetrafluoroethylene-lined fry pans over measured time intervals (usually 2 min), cooled in a trough of cooling water, and weighed to determine product output rate. Occasionally throughout the experiment, polymer throughput was determined gravimetrically with the liquid streams turned off. By-product methanol and some of the unreacted PEG were removed near the output end of the Berstorff at a vacuum port on the extruder connected to the vacuum pump and cold trap described above.

The Berstorff extruder screw speed was 200 rpm. Catalyst flow-rate and Berstorff barrel temperature were varied in the manner described in Table 12. The internal melt temperature near the die was about 205° C. As seen in Table 12, it has been possible to graft at least part of the PEG in the short residence time of the extruder, as determined by $^1$H NMR analysis.

For the $^1$H NMR analysis, each sample was dissolved at a 1% concentration in perdeuterotetrachloroethane, treated with a small amount of trifluoroacetic anhydride, and heated 30 min at 100° C. to enable the anhydride to consume the OH terminals of the unreacted PEG. Protons resulting from the reaction of trifluoroacetic anhydride with the OH terminals of the ungrafted PEG appear at δ4.5 ppm ($CH_2OC[O]CF_3$). Protons resulting from the grafting of PEG onto E/MA appear at δ4.2 ppm ($CH_2OCO$ moiety linked to the polymer backbone). Protons that represent the methyl acrylate (MA) content at the beginning of the reaction appear at δ2.3 ppm (CHCOO moiety). The grafted/total (grafted+unreacted) PEG is determined by dividing the area under the δ4.2 ppm peak by the sum of the areas under the peaks at δ4.2 and δ4.5 ppm. The mol % of MA grafted by PEG (CH$_3$O displaced by PEG) is determined by dividing the area under the δ4.2 ppm peak by the area under the δ2.3 ppm peak and adjusting for the number of protons that each peak represents.

Some of the products obtained from extruder-grafting of PEG, above, were compounded on a rubber mill with a peroxide-type curing recipe and vulcanized. Unmodified E/62MA was similarly compounded and vulcanized (Comparative Example L). The vulcanizate physical properties in Table 13 show that the PEG-modification does not adversely affect the properties of E/62MA and does not, surprisingly, increase hot water swell, even though PEG is known to have an affinity for water.

TABLE 12

| Example | 37 | 38 | 39 | 40 | 41 | 42 | 43 | 44 | 45 |
|---|---|---|---|---|---|---|---|---|---|
| Avg. M$_n$ of PEG | 350 | 350 | 350 | 350 | 350 | 550 | 550 | 550 | 550 |
| Set temperature, zones 2–8, °C.[1] | 280 | 280 | 260 | 260 | 260 | 280 | 280 | 260 | 260 |
| Screw rpm | 200 | 200 | 200 | 200 | 200 | 200 | 200 | 200 | 200 |
| Extruder amps | 5.5 | 5.5 | 5.5 | 5.5 | 5.5 | 5.5 | 5.5 | 5.5 | 5.5 |
| Catalyst injection zone | 5 | 3 | 5 | 5 | 3 | 5 | 3 | 5 | 3 |
| Catalyst feed rate, ml/min[2] | 2.2 | 3.0 | 3.0 | 2.5 | 3.0 | 2.5 | 2.5 | 2.5 | 4.0 |
| Total output, g/min | 69.0 | 62.9 | 67.4 | 67.3 | 66.2 | 65.5 | 66.6 | — | 68.2 |
| Grafted/total PEG in sample ($^1$H NMR) | 45 | 42 | 38 | 21 | 17 | 30 | 21 | 2 | 4 |
| % of MA grafted by PEG | 1.40 | 1.87 | 1.32 | 1.01 | 1.05 | 1.09 | 0.58 | 0.46 | 0.42 |

[1]All extruder zones set at same temperature, except die (200° C.).
[2]E/62MA fed from satellite extruder at ~63 g/min and PEG fed via injection pump, at 7.0 ml/min.

TABLE 13

| POLYMER OF EXAMPLE | 39 | 37 | 42 | L |
|---|---|---|---|---|
| Polymer | 120 | 120 | 120 | 120 |
| ARMEEN ® 18D | 0.6 | 0.6 | 0.6 | 0.6 |
| VANFRE ® VAM | 0.6 | 0.6 | 0.6 | 0.6 |
| STEARIC ACID | 1.8 | 1.8 | 1.8 | 1.8 |
| NAUGARD ® 445 | 1.2 | 1.2 | 1.2 | 1.2 |
| SRF BLACK(N-774) | 78 | 78 | 78 | 78 |
| TP-759 | 6 | 6 | 6 | 6 |
| VULCUP ® R | 3 | 3 | 3 | 3 |
| HVA ® -2 | 1.2 | 1.2 | 1.2 | 1.2 |
| MDR, 0.5 arc, 177° C. | | | | |
| Torque, mm N-m | 0.02 | 0.02 | 0.02 | 0.02 |
| Torque, max N-m | 0.46 | 0.51 | 0.54 | 0.74 |
| Torque, end N-m | 0.45 | 0.50 | 0.53 | 0.74 |
| TC 50, min | 1.25 | 1.32 | 1.26 | 1.54 |
| TC 90, mm | 4.36 | 4.56 | 4.44 | 5.23 |
| Scorch Time(TS 2) min:sec | 1.28 | 1.28 | 1.13 | 1.12 |
| Peak Rate(S'/min) | 3.2 | 3.23 | 3.76 | 3.52 |
| MOONEY VISCOSITY | | | | |
| 100 C, ML-4 | 8.15 | 7.21 | 7.98 | 13.58 |
| STRESS-STRAIN[1] | | | | |
| Original, 25° C. | | | | |
| 100% Modulus, MPa | 1.62 | 1.78 | 1.87 | 2.69 |
| 200% Modulus, MPa | 3.82 | 4.35 | 4.64 | 6.33 |
| Tensile Str., MPa | 7.71 | 8.46 | 8.26 | 10.91 |
| Elongation, % | 430 | 427 | 373 | 367 |
| SHORE HARDNESS A[1] | | | | |
| Press Cured Slab | 47 | 48 | 50 | 53 |
| COMPRESSION SET[1] | | | | |
| Method B, %, 70 hrs, 150° C., Lg. Plied Pellets | 46 | 50 | 50 | 57.5 |

TABLE 13-continued

| POLYMER OF EXAMPLE | 39 | 37 | 42 | L |
|---|---|---|---|---|
| FLUID RESISTANCE[1] | | | | |
| Volume Change, % | | | | |
| 70 h/150° C./IRM 903 OIL | 51.71 | 48.76 | 46.81 | 56.14 |
| 70 h/100° C./H$_2$O | −0.055 | −1.11 | 1.42 | 1.82 |

[1]Samples press-cured 15 min @ 177° C. Compression set pellets consists of several plies of disks cured under the same conditions

EXAMPLES 46–52

It is possible to graft short-chain alkyl, aryl, or alkyl-aryl ethers of ethylene oxide timers, trimers and other oligomers, which can also afford desirable reductions in the $T_g$ of E/MA. These oligomers may be volatile enough that the ungrafted portions may be removed by evaporation from the product, for example from the vacuum vent port of the extruder in which the grafting reaction may be conducted.

A series of E/62MA grafts were prepared from a variety of oligoethers in the manner described for Examples 16–19, except that 36.0 g of E/62MA, 4.0 g of oligoether, and 0.34 ml of 25% (w/w) Ti(O-n-bu)$_4$ in isodurene were used for each, and the reaction was conducted at 200° C. Results are given in Table 14. All of the oligoethers appeared miscible in the melt, and several reduced the $T_g$ of the polymer. Diethylene glycol hexyl ether and "poly"ethylene glycol butyl ether (approximately, on average, a trimer) gave 65–72% grafting and substantial $T_g$ reductions.

The following materials were used:

| E/63MA/5MAME | Supplier: DuPont Company Wilmington, DE U.S.A. |
|---|---|
| Jeffamine ® M-2070 polyether amine containing 76% ethylene oxide units/24% propylene oxide units. MW = approx 2000 | Supplier: Huntsman Corp. Salt Lake City, Utah, U.S.A. |

The E/MA/MAME polymer having a temperature of about 100° C. was fed at a controlled rate into Zone 1 of the twin-screw extruder. The Berstorff extruder consisted of 8 zones, Zones 2–8 heated to the temperatures listed in Table 15, and a ninth zone (the die) set at 150° C. The poly (ethylene oxide-co-propylene oxide)amine (PEPO) was fed into Zone 2 of the twin-screw extruder at the rates shown in Table 15. The three long mixing elements on the screw were situated at the beginning of Zone 3, the middle of Zone 4, and the end of Zone 5. The melt seal was located at the end

TABLE 14

| Example | Reactant (10 wt %) | Reactant MW | Reactant B.P. (° C.) | $T_g$ of product (° C.) | % Reaction by $^1$H NMR |
|---|---|---|---|---|---|
| 46 | C$_4$H$_9$(OCH$_2$CH$_2$)$_3$OH | 206 | | −32 | 65 |
| 47 | C$_6$H$_{13}$(OCH$_2$CH$_2$)$_2$OH | 190 | 260 | −31 | 72 |
| 48 | C$_4$H$_9$(OCH$_2$CH$_2$)$_2$OH | 162 | 231 | −29 | 63 |
| 49 | CH$_3$(OCH$_2$CH[CH$_3$])$_3$OH | 206 | 100/266 Pa | −28 | |
| 50 | CH$_3$(OCH$_2$CH$_2$)$_3$OH | 164 | 122/1330 Pa | | |
| | 4-(C$_8$H$_{17}$)-C$_6$H$_4$(OCH$_2$CH$_2$)$_n$OH | | | | |
| 51 | n = 5 | | | −25 | |
| 52 | n = 12 | | | −27 | |

EXAMPLES 53 AND 54 AND COMPARATIVE EXAMPLE M

The following equipment was used for these Examples:

(a) A 5.1 cm (2") satellite single-screw extruder to feed E/MA elastomer.
(b) Berstorff® (Florence, Ky., USA) ZE-25 twin screw extruder, 25 mm diameter, L/D=38, co-rotating, intermeshing. A general mixing screw consisting mainly of conveying elements with three long banks (approx 2 L/D) of gear mixing elements with a melt seal element ahead of the vent zone and a short mixing element in between the seal and the vent opening.
(c) ISCO® (ISCO Inc., Lincoln, Nebr., USA) digital syringe pump, model 500D, to feed polyether amine.
(d) Nash MHC25 vacuum pump (vacuum 3.2 kPa absolute)

of Zone 6. The extruder screw speed was 128 rpm. After a steady-state throughput rate of polymer was achieved, injection of PEPO was initiated. The PEPO reacted with anhydride generated in the polymer to produce the PEPO grafted E/MA/MAME polymer. The graft polymer product exiting the die was collected in tared polytetrafluoroethylene-lined pans over measured time intervals (usually 2 min), cooled in a trough of cooling water, and weighed to determine product output rate. By-product water and ethanol was removed at the vacuum port in Zone 7 near the output end of the twin-screw extruder.

As shown in Table 15, the graft products contained 5.5 and 10.5 wt % PEPO. The polyether amine was completely reacted as determined by FTIR analysis of the amount of anhydride consumed during the grafting reaction. The low temperature benefits of the PEPO graft polymer are shown by the lower glass transition temperatures (Tg) of the grafts, −28.3 and −32.4° C. vs. that of the ungrafted base polymer, −25.2° C.

TABLE 15

| EXAMPLE | M | 53 | 54 |
|---|---|---|---|
| Set Temperature ° C., Zone 2 | 150 | 150 | 150 |
| Set Temperature ° C., Zone 3 | 220 | 220 | 220 |
| Set Temperature ° C., Zone 4 | 230 | 230 | 230 |
| Set Temperature ° C., Zone 5 | 230 | 230 | 230 |
| Set Temperature ° C., Zone 6 | 230 | 230 | 230 |
| Set Temperature ° C., Zone 7 | 220 | 220 | 220 |
| Set Temperature ° C., Zone 8 | 180 | 180 | 180 |
| Temperature ° C., Die | 150 | 150 | 150 |
| Temperature ° C., Melt | 172 | 172 | 172 |
| Screw rpm | 128 | 128 | 128 |
| Extruder amps | 6.5 | 6.3 | 6.1 |
| PEPO feed rate, ml/mm | 0 | 4.61 | 9.31 |
| % Anhydride in product | 0.85 | 0.50 | 0.40 |
| % of Grafted PEPO in product | 0 | 5.5 | 10.5 |
| Total output, g/min | 88.2 | 93.1 | 97.8 |
| Melt Index | 8.1 | 12.0 | 16.1 |
| Tg by DSC, ° C. | −25.2 | −28.3 | −32.4 |

The above products obtained from extruder-grafting of PEPO, were compounded on a rubber mill using a carbon black formulation. The compounds were vulcanized with a diamine/guanidine curing system and the properties determined. Ungrafted E/63MA/5MAME was similarly compounded and vulcanized (Comparative Example M). The vulcanizate data in Table 16 show that the PEPO modification yields graft polymers having very good physical properties without markedly increasing hot water swell. These PEPO-modified compositions have improved low temperature properties as the Tg differences seen in the uncompounded graft polymers carry through to the carbon black vulcanizates.

TABLE 16

| EXAMPLE | M | 53 | 54 |
|---|---|---|---|
| Polymer | 100 | 100 | 100 |
| Vanfre ® VAM | 1 | 1 | 1 |
| Armeen ® 18D | 0.5 | 0.5 | 0.5 |
| Stearic Acid | 1.5 | 1.5 | 1.5 |
| Naugard ® 445 | 2.0 | 2.0 | 2.0 |
| FEF Carbon Black (N-550) | 60 | 60 | 60 |
| TP-759 | 10 | 10 | 10 |
| Diak ® #1 | 1.5 | 1.5 | 1.5 |
| DOTG | 4.0 | 4.0 | 4.0 |
| Tg OF COMPOUNDED POLYMER[1] By DSC, ° C. | −21.0 | −23.9 | −28.4 |
| MOONEY VISCOSITY 100° C., ML-4 | 55.4 | 44.2 | 38.6 |
| MDR, 0.5 arc, 15 mm @ 177° C. | | | |
| Torque, min N-m | 0.05 | 0.05 | 0.05 |
| Torque, max N-m | 1.46 | 1.41 | 1.29 |
| Torque, end N-m | 1.46 | 1.41 | 1.29 |
| TC 50, min | 1.52 | 2.11 | 2.32 |
| TC 90, mm | 6.14 | 7.07 | 7.58 |
| Scorch Time (ts2) min:sec | 0.51 | 0.58 | 1.09 |
| Peak Rate (S'/min) | 4.74 | 3.92 | 3.05 |
| MOONEY VISCOSITY, 100° C., ML-4 | 55.4 | 44.2 | 38.6 |
| STRESS-STRAIN[2] | | | |
| 100% Modulus, MPa | 8.8 | 8.2 | 7.6 |
| 200% Modulus, MPa | 18.4 | 16.8 | 15.1 |
| Tensile Strength, MPa | 19.4 | 17.1 | 16.3 |
| Elongation, % | 232 | 216 | 246 |
| SHORE HARDNESS A[2], Press Cured Slab | 76 | 73 | 66 |
| COMPRESSION SET[2,3] Method B, % | | | |
| Plied Pellets, 70 hrs @ 150° C. | 16.5 | 18.1 | 24.1 |

TABLE 16-continued

| EXAMPLE | M | 53 | 54 |
|---|---|---|---|
| FLUID RESISTANCE[2] Volume Change, % | | | |
| 70 hrs/150° C./IRM 903 OIL | 36.4 | 34.5 | 33.1 |
| 70 hrs/100° C./H$_2$O | 4.2 | 4.2 | 5.9 |

[1]Tg determined on vulcanizates using 1$^{st}$ heat
[2]Samples press-cured 5 min @ 177° C. + oven post-cure 4 hrs @ 177° C.
[3]Compression set pellets consist of several plies of disks cut from cured slabs.

EXAMPLES 55–57 AND COMPARATIVE EXAMPLE N

The following materials were used in these Examples:

| | |
|---|---|
| E/55MA/4MAME | Supplier: DuPont Company Wilmington, DE U.S.A. |
| Santonox ® TBMC | Supplier: Flexsys Akron, OH US.A. |
| Jeffamine ® M-2070 polyether amine containing 76% ethylene oxide units/24% propylene oxide units. MW = approx 2000 | Supplier: Huntsman Corp. Salt Lake City, UT U.S.A. |

The E/MA/MAME polymer was grafted with polyether amine (PEPO) in a manner similar to Examples 53 and 54 using the extruder conditions shown in Table 17. The PEPO was injected equally into Zones 2 and 3; a 50/50 solution of Santonox® TBMC stabilizer in acetone was also injected into Zone 3. The amount of Santonox® TBMC in the grafted product was approximately 2500 ppm.

As shown in Table 17, the graft products contained 7.4, 10.2 and 12.4 wt % PEPO. The glass transition temperatures (Tg) of the grafts as analyzed by DSC were found to be −34.1, −35.7, and −37.8° C.; the Tg of ungrafted polymer analyzed in the same manner was −28.9° C. Grafting lowered the Tg, improving the low temperature properties. The Tg decreased further as the amount of grafted polyether amine increased.

TABLE 17

| EXAMPLE | 55 | 56 | 57 |
|---|---|---|---|
| Set Temperature ° C., Zone 2 | 150 | 150 | 150 |
| Set Temperature ° C., Zone 3 | 150 | 150 | 150 |
| Set Temperature ° C., Zone 4 | 170 | 170 | 170 |
| Set Temperature ° C., Zone 5 | 170 | 170 | 170 |
| Set Temperature ° C., Zone 6 | 170 | 170 | 170 |
| Set Temperature ° C., Zone 7 | 170 | 170 | 170 |
| Set Temperature ° C., Zone 8 | 170 | 171 | 172 |
| Temperature °C. Die | 170 | 170 | 170 |
| Temperature ° C., Melt | 191 | 191 | 190 |
| Screw rpm | 252 | 251 | 250 |
| Extruder amps | 6.9 | 6.6 | 6.6 |
| Die pressure, psi | 440 | 410 | 400 |
| PEPO feed rate, ml/min | 6.97 | 9.84 | 12.26 |
| % of Grafted PEPO in product | 7.36 | 10.22 | 12.35 |
| Total output, g/min | 99.1 | 100.8 | 103.9 |
| Tg by DSC, ° C. | −34.1 | −35.7 | −37.8 |

The above E/MA/MAME grafts obtained from extruder-grafting of PEPO, were compounded on a rubber mill using a carbon black formulation. The compounds were vulcanized with a diamine/guanidine curing system and the properties determined. Ungrafted E/MA/MAME was similarly compounded and vulcanized (Comparative Example N). The vulcanizate data in Table 18 show that the PEPO modification yields graft polymers having good physical properties. As shown by the Tg differences, the low temperature properties of the grafts are improved over the ungrafted polymer.

can be compounded on a rubber mill using a carbon black formulation and then cured. The vulcanizate will have good physical properties and a Tg that is lower than the vulcanized prepared from ungrafted ethyl acrylate-itaconic acid monobutyl ester copolymer.

TABLE 18

| EXAMPLE | N | 55 | 56 | 57 |
|---|---|---|---|---|
| Polymer | 100 | 100 | 100 | 100 |
| Vanfre ® VAM | 1 | 1 | 1 | 1 |
| Armeen ® 18D | 0.5 | 0.5 | 0.5 | 0.5 |
| Stearic Acid | 1.5 | 1.5 | 1.5 | 1.5 |
| Naugard ® 445 | 2.0 | 2.0 | 2.0 | 2.0 |
| FEF Carbon Black (N-550) | 60 | 60 | 60 | 60 |
| Diak ® #1 | 1.5 | 1.5 | 1.5 | 1.5 |
| DOTG | 4.0 | 4.0 | 4.0 | 4.0 |
| Tg OF COMPOUNDED POLYMER[1], by DSC, ° C. | −28.0 | −32.0 | −34.0 | −35.1 |
| MDR, 0.5 arc, 15 mm @ 177° C. | | | | |
| Torque, min N-m | 0.04 | 0.04 | 0.04 | 0.03 |
| Torque, max N-m | 1.42 | 1.16 | 1.12 | 1.07 |
| Torque, end N-m | 1.42 | 1.16 | 1.11 | 1.07 |
| TC 50, mm | 2.01 | 2.58 | 3.21 | 3.33 |
| TC 90, mm | 5.16 | 7.55 | 8.53 | 9.15 |
| Scorch Time (ts2) min:sec | 0.58 | 1.24 | 1.36 | 1.45 |
| Peak Rate (S'/min) | 4.29 | 2.21 | 1.9 | 1.7 |
| STRESS-STRAIN[2] | | | | |
| 100% Modulus, MPa | 6.7 | 6.1 | 5.7 | 5.7 |
| 200% Modulus, MPa | 15.3 | 13.1 | 12.7 | 12.4 |
| Tensile Strength, MPa | 16.9 | 16.3 | 16.2 | 15.6 |
| Elongation, % | 226 | 291 | 299 | 291 |
| SHORE HARDNESS A[2] Press Cured Slab | 72 | 69 | 68 | 66 |
| COMPRESSION SET[2,3], Method B, % | | | | |
| Molded Pellets, 70 hrs @ 150° C. | 11.8 | 17.7 | 19.6 | 21.3 |

[1]Tg determined on vulcanizates using 1st heat
[2]Samples press-cured 5 min @ 177° C. + oven post-cure 4 hrs @ 177° C.
[3]Molded compression set pellets press-cured 15 min @ 177° C. + oven post-cure 4 hrs/177° C.

EXAMPLE 58

A copolymer of 95 wt % ethyl acrylate and 5 wt % itaconic acid monobutyl ester is grafted with Jeffamine® M-2070 polyether amine (PEPO) in a manner similar to Examples 53 and 54 within the range of extruder conditions shown in Table 19. Before the PEPO injection is begun, the polymer output from the extruder is 90 g/min. The PEPO is then injected into Zone 2 of the twin-screw extruder at 7 ml/min. At least part of the PEPO becomes grafted.

The glass transition temperatures (Tg) of the graft is analyzed by DSC and found to be lower than the Tg of ungrafted polymer analyzed in the same manner. Thus, grafting with PEPO lowers the Tg, improving the low temperature properties.

TABLE 19

| EXAMPLE | 58 |
|---|---|
| Set Temperature ° C., Zone 2 | 125–75 |
| Set Temperature ° C., Zone 3 | 125–250 |
| Set Temperature ° C., Zone 4 | 150–250 |
| Set Temperature ° C., Zone 5 | 150–250 |
| Set Temperature ° C., Zone 6 | 150–250 |
| Set Temperature ° C., Zone 7 | 150–250 |
| Set Temperature ° C., Zone 8 | 150–200 |
| Temperature ° C., Die | 150–200 |
| Temperature ° C., Melt | 170–220 |
| Screw rpm | 120–300 |

The above ethyl acrylate-itaconic acid monobutyl ester copolymer graft obtained from extruder-grafting of PEPO

What is claimed is:

1. A composition with a glass transition temperature less than −10 deg C., comprising:

(a) an elastomeric first polymer consisting essentially of about 10 to about 80 mole percent of ethylene, about 10 or more mole percent of:

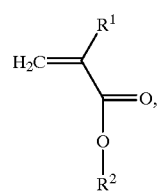

(I)

and up to about 20 mole percent, total, of one or more other polymerizable olefins; and (b) 2 to 20 weight percent of a second polymer that is a polylactone;

wherein:
each $R^1$ is independently methyl or hydrogen; and
each $R^2$ is independently hydrocarbyl or substituted hydrocarbyl;

and provided that the polylactone is present as a separate polymer from said first polymer, or grafted to said first polymer.

2. The composition as recited in claim 1 wherein (I) is methyl acrylate, or (I) is methyl acrylate and said other polymerizable monomer is the monoethyl ester of maleic acid.

3. The composition as recited in claim 1 wherein said second polymer is poly($\epsilon$-caprolactone).

4. The composition as recited in claim 2 wherein said second polymer is a poly($\epsilon$-caprolactone).

5. The composition as recited in claim 4 wherein at least 10 mole percent of said poly($\epsilon$-caprolactone) is grafted to said first polymer.

6. The composition as recited in claim 4 wherein said poly($\epsilon$-caprolactone) has a number average molecular weight of about 1,000 to about 20,000.

7. The composition as recited in claim 5 wherein said poly($\epsilon$-caprolactone) has a number average molecular weight of about 10,000 to about 100,000, and is ungrafted to said first polymer or grafted to said first polymer by a free radical process.

8. The composition as recited in claim 4, 5, 6 or 7 wherein said poly($\epsilon$-caprolactone) is about 2 to about 20 weight percent of said first polymer.

9. The composition as recited in claim 1 wherein said second polymer is about 2 to about 20 weight percent of said first polymer.

10. The composition as recited in claims 1, 2 or 11 which is crosslinked.

\* \* \* \* \*